(12) United States Patent
Forster (10) Patent No.: US 10,665,921 B2
(45) Date of Patent: May 26, 2020

(54) EDGE ON FOAM TAGS

(71) Applicant: Avery Dennison Retail Information Services, LLC, Mentor, OH (US)

(72) Inventor: Ian James Forster, Essex (GB)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 14/565,726

(22) Filed: Dec. 10, 2014

(65) Prior Publication Data

US 2016/0172742 A1    Jun. 16, 2016

(51) Int. Cl.
*H01Q 1/22* (2006.01)
*H01Q 1/38* (2006.01)
*G06K 19/077* (2006.01)
*G08B 13/24* (2006.01)

(52) U.S. Cl.
CPC ..... *H01Q 1/2208* (2013.01); *G06K 19/07771* (2013.01); *G08B 13/2428* (2013.01); *H01Q 1/38* (2013.01)

(58) Field of Classification Search
CPC .... G08B 13/2428; H01Q 1/38; H01Q 1/2208; G06K 19/07771
USPC ........................... 343/700 MS, 878
See application file for complete search history.

(56) References Cited

U.S. PATENT DOCUMENTS

| | | | | |
|---|---|---|---|---|
| 4,490,027 A * | 12/1984 | Frank | ........................ | G03B 7/24 324/251 |
| 6,824,320 B1 * | 11/2004 | Kerr | ........................ | G03B 17/26 242/348 |
| 7,843,032 B1 * | 11/2010 | Khieu | ................. | H01L 27/0251 257/122 |
| 2003/0197650 A1 * | 10/2003 | Walton | ................. | H01Q 1/1278 343/713 |
| 2007/0145150 A1 * | 6/2007 | Barczyk | ........... | G06K 19/07749 235/492 |
| 2009/0045964 A1 | 2/2009 | Takeda et al. | | |
| 2011/0095891 A1 * | 4/2011 | Fenkanyn | ........ | G06K 19/07749 340/572.7 |
| 2011/0168788 A1 * | 7/2011 | Sonoda | ............ | G06K 19/07749 235/492 |

(Continued)

FOREIGN PATENT DOCUMENTS

| CN | 1650470 | 8/2005 |
|---|---|---|
| CN | 1898686 | 1/2007 |

(Continued)

OTHER PUBLICATIONS

CN103640782, Mar. 2014 Translated document.*

(Continued)

*Primary Examiner* — Graham P Smith
*Assistant Examiner* — Jae K Kim (57) ABSTRACT

An RFID antenna structure is disclosed that is designed to operate in proximity to metal surfaces. The RFID antenna structure is placed at 90 degrees to the surface of the metallic object, allowing it to operate with minimal separation from the edge of the RFID antenna structure to the metallic object. In another embodiment, the RFID antenna structure comprises an anti-tamper embodiment wherein a RFID tag device is applied to twist and flip-top cap containers, such that tearing along the perforations on the cap disables the RFID tag device.

14 Claims, 13 Drawing Sheets

(56) References Cited

U.S. PATENT DOCUMENTS

2011/0266351 A1* 11/2011 Wagner ............ G06K 19/07722
235/488

FOREIGN PATENT DOCUMENTS

| CN | 1977281 | | 6/2007 | |
|---|---|---|---|---|
| DE | 201110106275 | * | 7/2011 | ............. B65D 41/54 |
| WO | 2005062247 | | 7/2005 | |
| WO | 2006045395 | | 5/2006 | |

OTHER PUBLICATIONS

International Search Report and Written Opinion dated Jun. 1, 2016 for International Application No. PCT/US2015/064883 filed Dec. 10, 2015.

* cited by examiner

EDGE ON FOAM TAGS

BACKGROUND OF THE INVENTION

The present invention relates generally to a radio-frequency identification (RFID) antenna that is designed to operate in proximity to metal surfaces. Specifically, the antenna is positioned at 90 degrees to the surface, allowing the antenna to operate with minimal separation from the edge of the RFID antenna to the metallic object. The present subject matter is especially suitable for food and medication containers. In accordance with embodiments of the present subject matter, an RFID antenna is provided that is designed to operate in proximity to conductive surfaces, with the surfaces including high dielectric constant and high dielectric loss, such as some liquids, gels, solutions, and combinations of these surfaces and material. Particular relevance is found in connection with sealed food and medication containers. Accordingly, the present specification makes specific reference thereto. However, it is to be appreciated that aspects of the present inventive subject matter are also equally amenable to other like applications.

Radio-frequency identification ("RFID") is the use of electromagnetic energy ("EM energy") to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user typically cannot alter this serial/identification number and manufacturers guarantee that each serial number is used only once. This configuration represents the low cost end of the technology in that the RFID tag is read-only and it responds to an interrogation signal only with its identification number. Typically, the tag continuously responds with its identification number. Data transmission to the tag is not possible. These tags are very low cost and are produced in enormous quantities.

Such read-only RFID tags typically are permanently attached to an article to be tracked and, once attached, the serial number of the tag is associated with its host article in a computer data base. The RFID tag data, both a unique ID and data stored in a read/write memory, may also be associated in a database with a host article, but not always. The tag may store data read from a bar code, or the item identification, its manufacturing date etc. and have no association with a database or requirement to access one.

Read only tags, those that respond with a pre-programmed code when powered up at a regular or pseudo random interval, are no longer commonly used.

Most tags now incorporate chips that include both read only memory, that usually contains configuration bits, manufacturers ID, chip model number and a unique ID ranging between 2 and 9 bytes in length, and read write memory commonly between 12 and 16 bytes, although larger memories may be used. The unique ID is used in combination with the manufacturers ID and chip model number (two different chip manufacturers could use the same unique ID).

Specifically, an object of the tag is to associate it with an article throughout the article's life (the tag may be applied at any point in the supply chain, not necessarily for the articles life) in a particular facility, such as a manufacturing facility, a transport vehicle, a health care facility, a pharmacy storage area, or other environment, so that the article may be located, identified, and tracked, as it is moved. Tracking the articles through the facility can assist in generating more efficient dispensing and inventory control systems as well as improving work flow in a facility. This results in better inventory control and lowered costs. In the case of medical supplies and devices, it is desirable to develop accurate tracking, inventory control systems, and dispensing systems so that RFID tagged devices and articles may be located quickly should the need arise, and may be identified for other purposes, such as expiration dates or recalls.

Many RFID tags used today are passive in that they do not have a battery or other autonomous power supply and instead, must rely on the interrogating energy provided by an RFID reader to provide power to activate the tag. Passive RFID tags require an electromagnetic field of energy of a certain frequency range and certain minimum intensity in order to achieve activation of the tag and transmission of its stored data. Another choice is an active RFID tag; however, such tags require an accompanying battery to provide power to activate the tag, thus increasing the expense and the size of the tag and making them undesirable for use in a large number of applications.

Depending on the requirements of the RFID tag application, such as the physical size of the articles to be identified, their location, and the ability to reach them easily, tags may need to be read from a short distance or a long distance by an RFID reader. Furthermore, the read range (i.e., the range of the interrogation and/or response signals) of RFID tags is also limited.

Furthermore, when the RFID tags are attached to a conductive surface, an RFID tag may have difficulties in being read. In those situations where reading a tag is problematic, such as where the space between a dipole and its image is small reducing the space creates difficulty in reading the tag, such as where the space is very small (less than one wavelength), then the total effective current between the dipole and its image is equal to zero or near zero. As the spacing between the antenna and the metal plane decreases the efficiency of the antenna reduces and it becomes difficult to achieve an impedance match to a device such as an RFID chip over a useful bandwidth. The issues become more apparent when the spacing is ~<1% of one wavelength; these problems can be mitigated to some extent by using a separator between the antenna and plane. For example, a high dielectric constant material may be used, or a material with both a high dielectric constant and high relative permeability, to increase the effective separation. However, such materials are expensive, and not suitable for RFID tags, where lower cost materials, such as papers/card, simple plastics such as PET and polypropylene foams are more desirable; all of these have relatively low dielectric constants.

Thus, the total radiated field is negligible and therefore, the RFID tag is unable to capture data and power from the reader. This is a significant problem given that in many commercial applications it is desirable to apply the RFID tag to a metal or other type of conductive surface. What is needed therefore is an RFID tag device and/or system that allows the RFID tag to operate in proximity to metal surfaces or other types of conductive surfaces.

The present invention discloses an RFID antenna structure that is designed to operate in proximity to metal surfaces. The RFID antenna structure is placed at 90 degrees to the surface of the metallic object, allowing it to operate with minimal separation from the edge of the RFID antenna structure to the metallic object.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an RFID antenna structure that is designed to operate in proximity to metal surfaces. The RFID antenna structure is placed at 90 degrees to the surface of the metallic object, allowing it to operate with minimal separation from the edge of the RFID antenna structure to the metallic object.

In a preferred embodiment, the RFID antenna structures may be thin and formed into a number of shapes depending on the form factor used. Specifically, the RFID antenna structure can be linear and incorporated into a protective plastic layer by extrusion, wrapped in a number of shapes, wrapped around a form and placed in a cavity, or incorporated into a structure by injection molding. In another embodiment, the container comprises an anti-tamper (or tamper evident) embodiment wherein the RFID tag device is applied to twist and flip-top cap containers, wherein tearing along the perforations on the cap disables the RFID tag device.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses an RFID antenna structure that is designed to operate in proximity to metal surfaces. The RFID antenna structure is placed at 90 degrees to the surface of the metallic object, allowing it to operate with minimal separation from the edge of the RFID antenna structure to the metallic object. Furthermore, the RFID antenna structures may be thin and formed into a number of shapes depending on the form factor used. Specifically, the RFID antenna structure can be linear and incorporated into a protective plastic layer by extrusion, wrapped in a number of shapes, wrapped around a form and placed in a cavity, or incorporated into a structure by injection molding.

Figure 1:
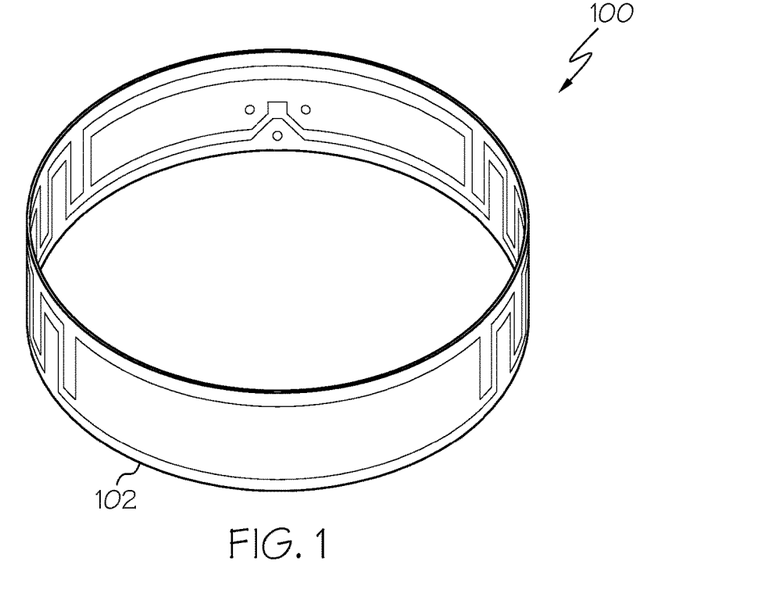
FIG. 1 illustrates a top perspective view of the RFID antenna structure in accordance with the disclosed architecture.

Referring initially to the drawings, FIG. 1 illustrates the RFID antenna structure 100 that is designed to operate in proximity to metal surfaces. The RFID antenna structure 100 is placed at 90 degrees (or any other suitable distance) to the surface of the metallic object, allowing it to operate with minimal separation from the edge 102 of the RFID antenna structure 100 to the metallic object. The RFID antenna structure 100 can comprise any suitable antenna as is known in the art, such as, but not limited to, a dipole antenna. Specifically, the RFID antenna structure 100 is formed from an RFID inlay that can be adhered to a material such as paper, plastic, or foam, such as, but not limited to, an Avery Dennison 160u7 inlay. The RFID inlay comprises an RFID chip and aluminum, copper or silver antenna bonded to a polyethylene terephthalate (PET) layer or other suitable layer as is known in the art. The RFID inlay can then be adhered to the back side of a label or other suitable material and printed and encoded in an RFID printer.

The RFID antenna structure 100 can be any suitable size, shape, and configuration as is known in the art without affecting the overall concept of the invention. One of ordinary skill in the art will appreciate that the shape and size of the antenna structure 100 as shown in FIG. 1 is for illustrative purposes only and many other shapes and sizes of the antenna structure 100 are well within the scope of the present disclosure. Although dimensions of the antenna structure 100 (i.e., length, width, and height) are important design parameters for good performance, the antenna structure 100 may be any shape or size that ensures optimal performance and sensitivity during use.

Figure 2:
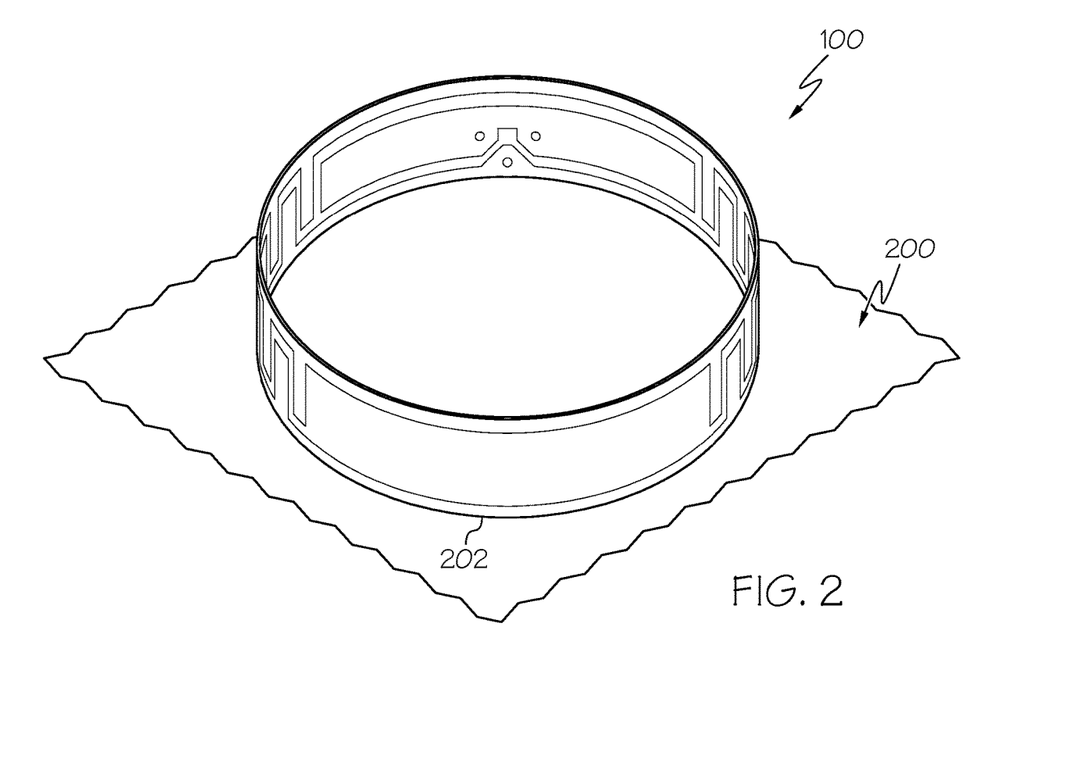
FIG. 2 illustrates a top perspective view of the RFID antenna structure on a metallic object in accordance with the disclosed architecture.
Figure 3:
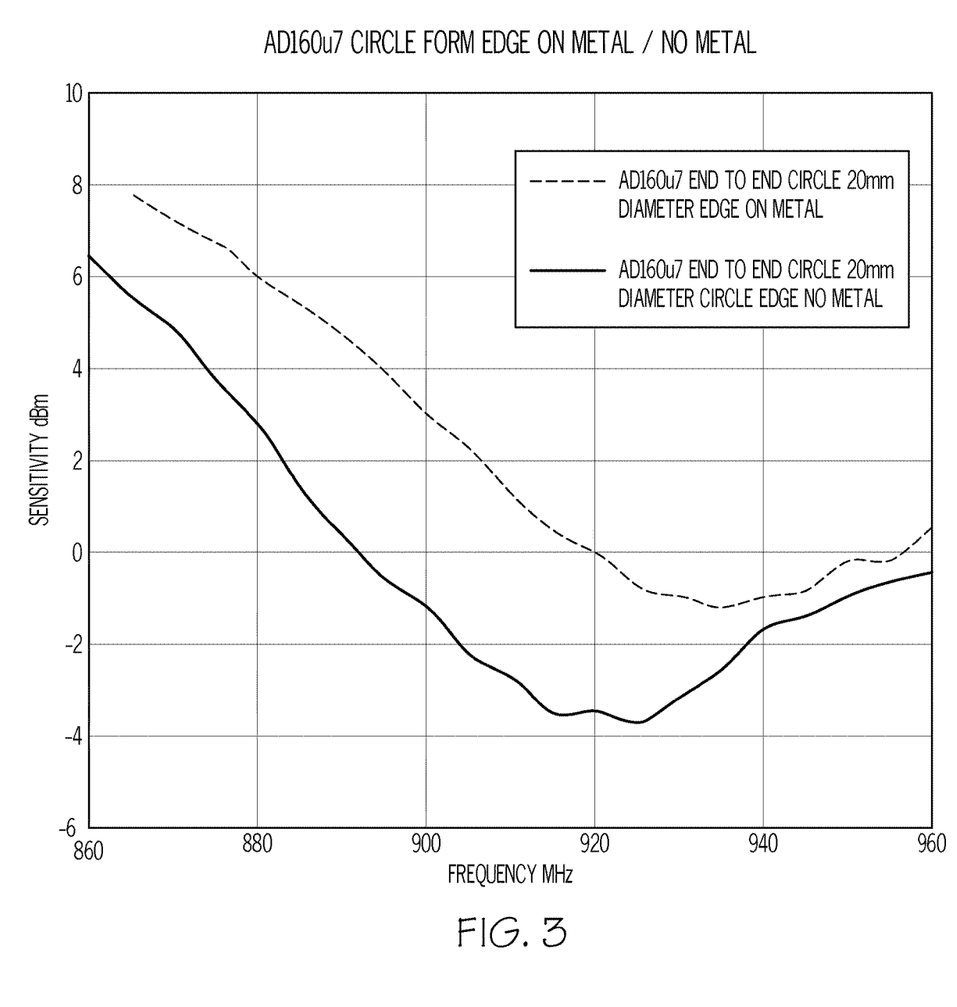
FIG. 3 illustrates a graph of the RFID antenna performance on both a metal surface and a non-metal surface in accordance with the disclosed architecture.

As illustrated in FIG. 2, the RFID antenna structure 100 is shown on a metallic object 200. The RFID antenna structure 100 is placed at 90 degrees to the surface of the metallic object 200, allowing it to operate with minimal separation from the edge 202 of the RFID antenna structure 100 to the metallic object 200. With reference now to FIG. 3, there is illustrated a graph of the performance of the RFID antenna structure on both a metal surface and a non-metal surface.

Figure 4:
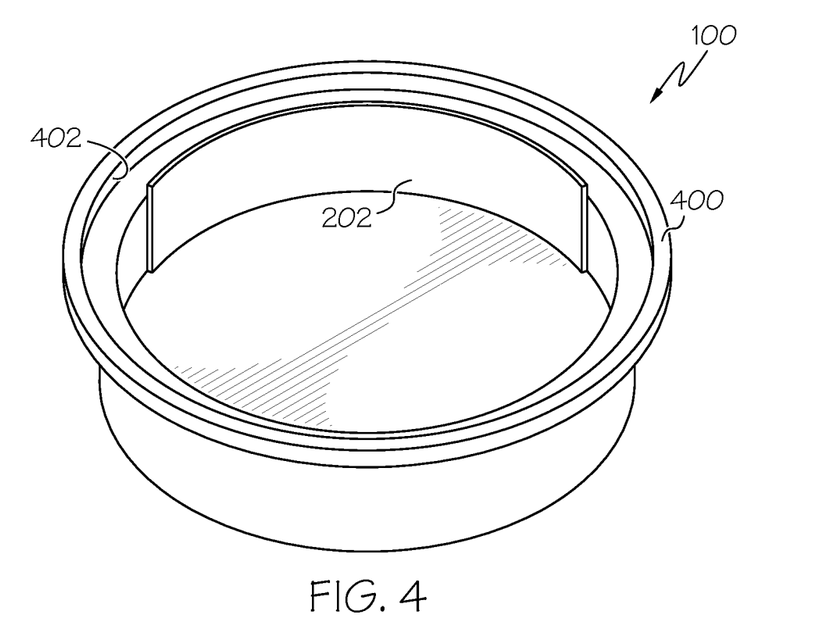
FIG. 4 illustrates a top perspective view of the RFID antenna structure within a lid of a container in accordance with the disclosed architecture.

With reference now to FIG. 4, there is illustrated the RFID antenna structure 100 in use with medication container. The RFID antenna structure 100 is formed into a circle and positioned within the interior of the lid 400 of the medication container. Specifically, the RFID antenna structure 100 is positioned against the threads 402 of the lid 400. Thus, once the lid 400 is screwed on the container, the edge 202 would contact the metal foil sealing disk of the container creating an edge on to the metallic surface. Typically, the RFID antenna structure 100 comprises a biaxially polypropylene (BOPP) face and a permanent adhesive to secure the RFID antenna structure 100 in the lid 400, however any other suitable materials can be used as is known in the art.

Figure 5:
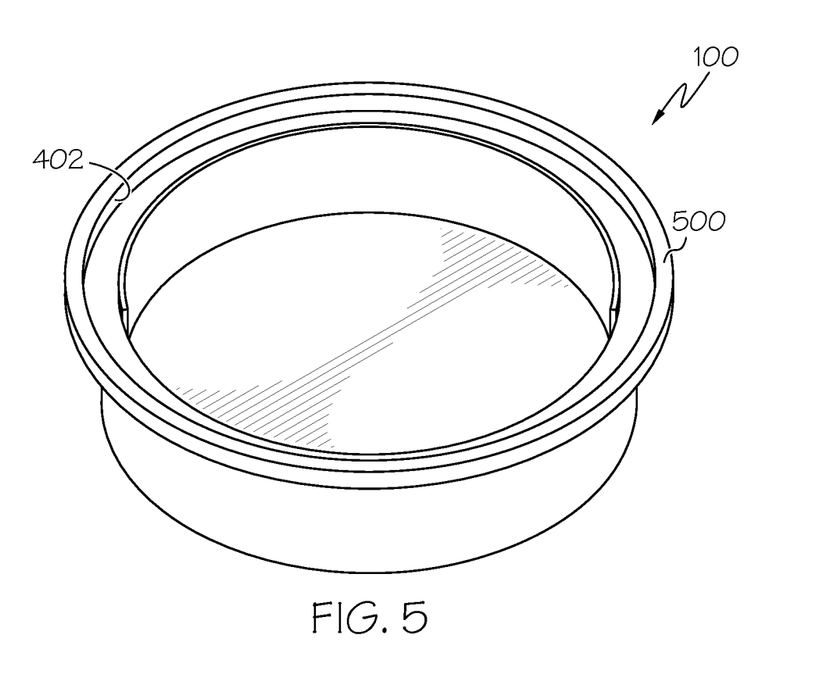
FIG. 5 illustrates a top perspective view of the RFID antenna structure within a larger lid of a container in accordance with the disclosed architecture.
Figure 6:
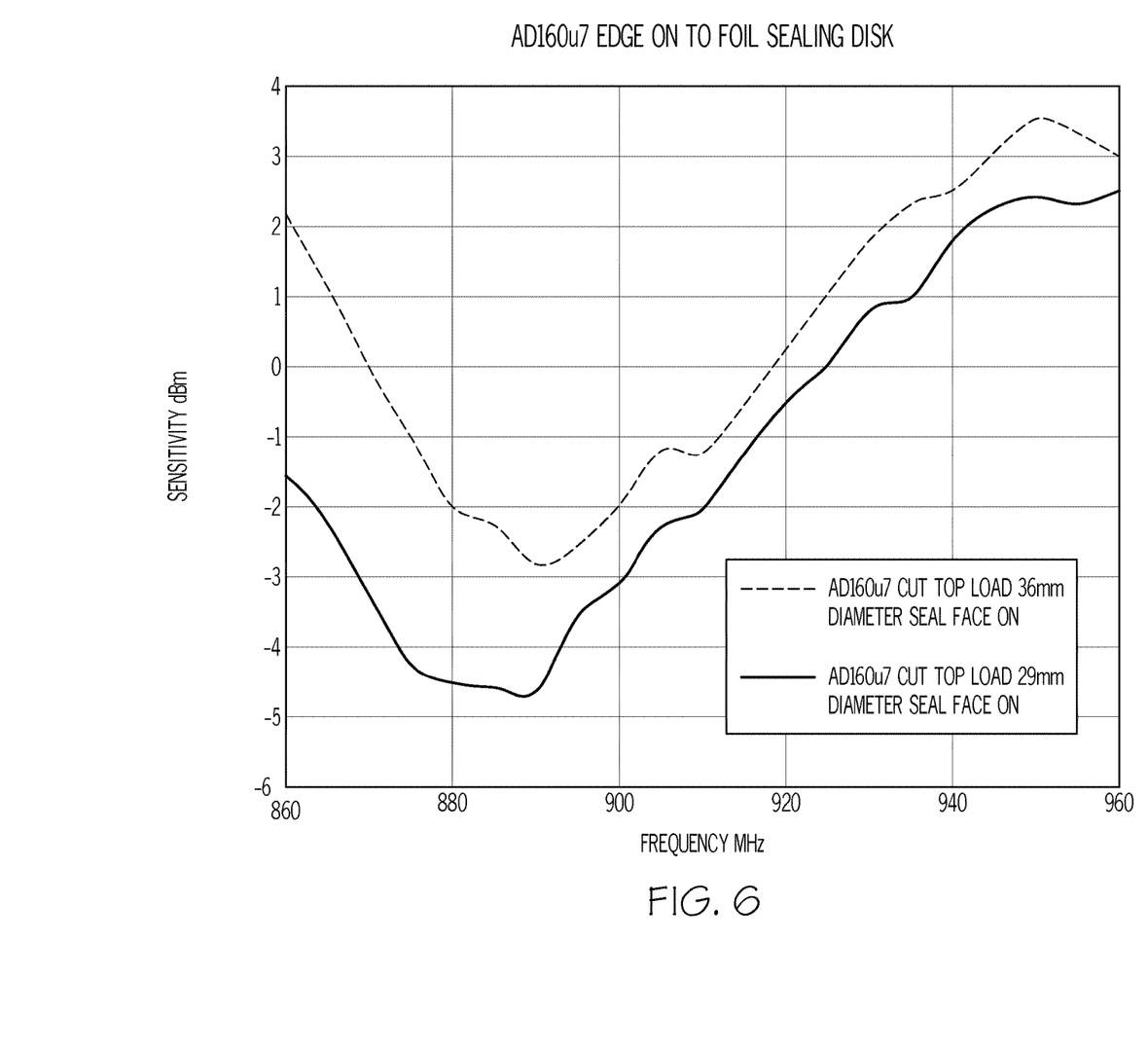
FIG. 6 illustrates a graph of the RFID antenna performance edge on to a foil sealing disk in accordance with the disclosed architecture.

FIG. 5 illustrates the RFID antenna structure 100 positioned in the same orientation but within a larger lid 500 of a medication container. Further, the action of the lid threads 402 engaging when the lid 500 is screwed on does not destroy the RFID antenna structure 100, and even after multiple tries, as well as over-tightening the lids 400 and 500, the RFID antenna structure 100 still functions. With reference now to FIG. 6, there is illustrated a graph of the performance of the RFID antenna structure edge on to a foil sealing disk.

Figure 7A:
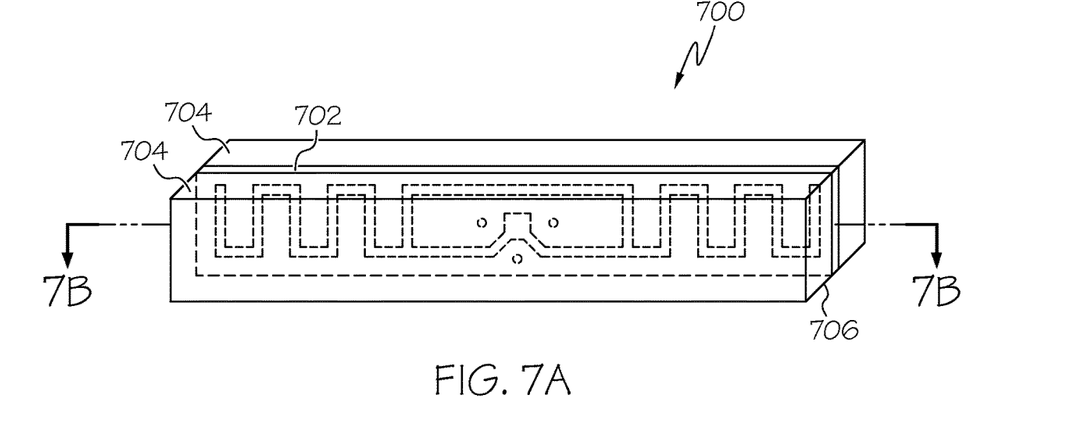
FIG. 7A illustrates a top perspective view of the RFID antenna structure made by flat roll to roll lamination in accordance with the disclosed architecture.
Figure 7B:
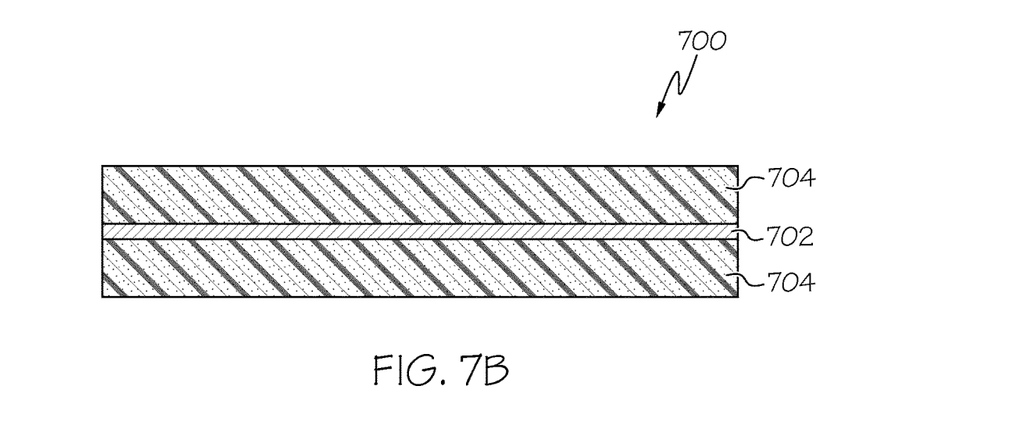
FIG. 7B illustrates a side perspective view of the RFID antenna structure in accordance with the disclosed architecture.

With reference now to FIGS. 7A-B, the RFID antenna structure 700 is shown. Specifically, FIG. 7A discloses the RFID antenna structure 700 configured as an RFID inlay 702 sandwiched between two sheets of material 704, such as paper, plastic, or foam. Specifically, the material is typically laminated around the material 704 and then cut into shapes, such as circles, rectangles, hexagons, triangles, etc., or any other suitable shape as is known in the art. When mounted on a metal surface so that the edge 706 of the RFID inlay 702 is in proximity to the metal surface, good performance is achieved.

FIG. 7B discloses a side view of the RFID antenna structure 700. The RFID inlay 702 is shown sandwiched between two layers of material 704 (i.e., paper, plastic, or foam). Thus, the RFID inlay 702 is capable of operating on metal surfaces when made by flat roll to roll lamination and slitting or die cutting, or any other suitable method as is known in the art.

Figure 8:
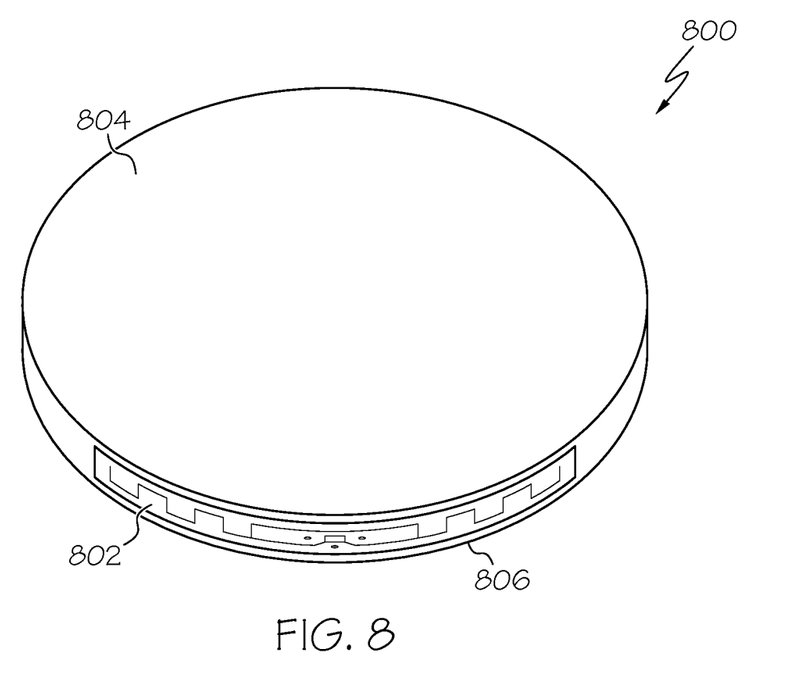
FIG. 8 illustrates a top perspective view of the RFID antenna structure wrapped around a shape in accordance with the disclosed architecture.

With reference now to FIG. 8, the RFID antenna structure 800 is shown wrapped around a shape. Specifically, FIG. 8 discloses the RFID antenna structure 800 configured as an RFID inlay 802 which is wrapped around a round object 804, such as a plastic disk or any other suitable shape as is known in the art. If the disk has a hole, then the RFID inlay 802 can be wrapped around an internal surface of the disk, such as a thread or other area. The RFID inlay 802 in either configuration is then placed in edge on proximity to a metal surface 806, such as a foil disk used to seal a medicine container, or any other suitable metal surface as is known in the art.

Figure 9:
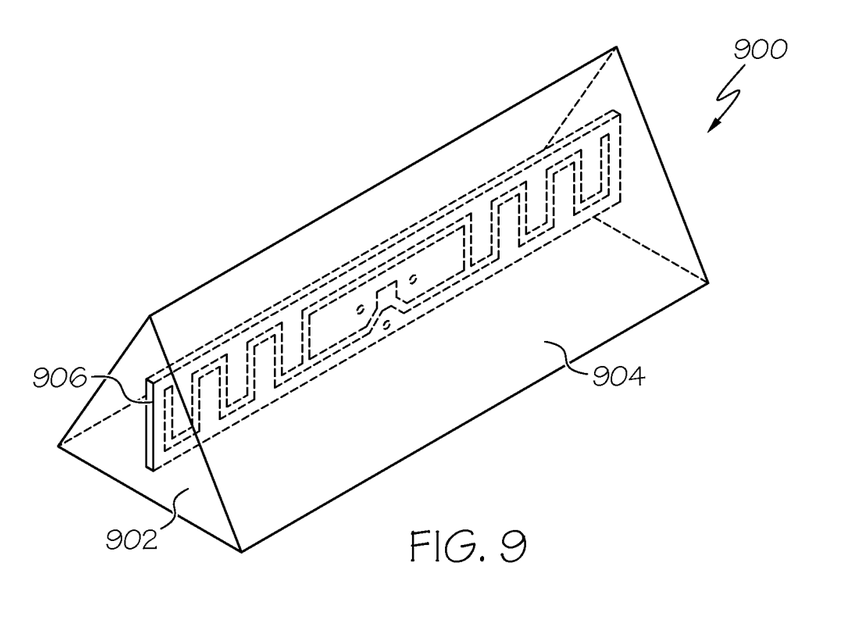
FIG. 9 illustrates a top perspective view of the RFID antenna structure extruded inside a plastic strip in accordance with the disclosed architecture.

With reference now to FIG. 9, the RFID antenna structure 900 is shown extruded inside a plastic strip 904. Specifically, FIG. 9 discloses the RFID inlay 902 extruded into a plastic strip 904, wherein the RFID inlay 902 is positioned down the center of the extrusion. FIG. 9 shows a triangular cross-section, but alternate multi-sided shapes can be used as well, as is known in the art. The RFID inlay 902 is then placed on its edge 906 proximate to any suitable metal surface as is known in the art.

Figure 10:
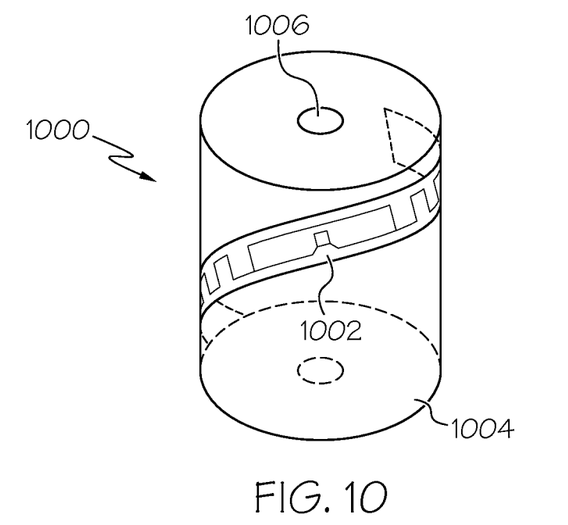
FIG. 10 illustrates a front perspective view of the RFID antenna structure wound helically around a narrower former in accordance with the disclosed architecture.

With reference now to FIG. 10, the RFID antenna structure 1000 is disclosed as being wound helically around a narrower former. Specifically, in order to reduce the diameter of the structure without making the ends of the RFID inlay 1002 overlap, the RFID inlay 1002 is wound helically around a narrower plastic former 1004. This plastic former 1004 can include a hole 1006 to allow the structure 1000 to be fixed by a bolt or screw to a surface, or any other attachment means as is known in the art. The RFID inlay 1002 is then able to be mounted such that the edge of the RFID inlay 1002 is in proximity to the metal surface.

Figure 11:
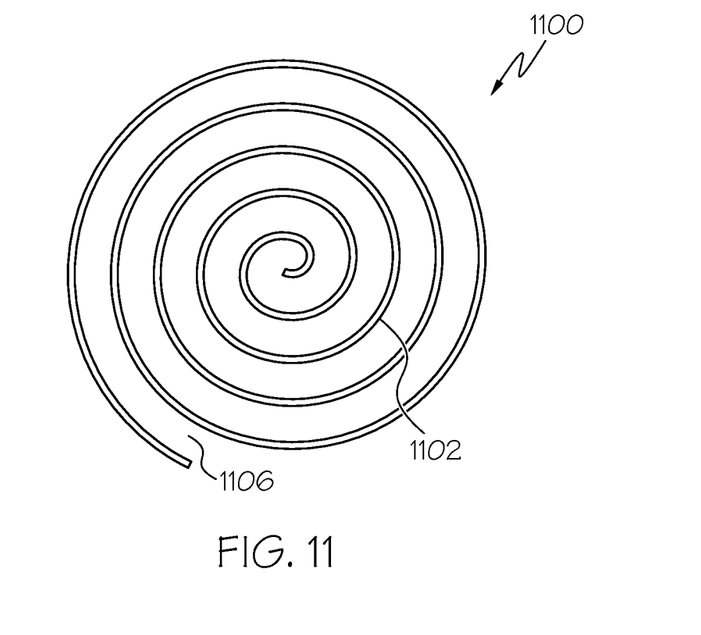
FIG. 11 illustrates a front perspective view of the RFID antenna structure formed into a flat spiral in accordance with the disclosed architecture.

With reference now to FIG. 11, the RFID antenna structure 1100 is disclosed as being formed into a flat spiral. Specifically, the RFID inlay 1102 is wound into a flat edge spiral that can be attached to a metal surface 1106. Thus, the RFID inlay 1102 in the shape of a spiral can be placed edge on a metal surface 1106 to achieve good performance of the antenna structure 1100.

Figure 12A:
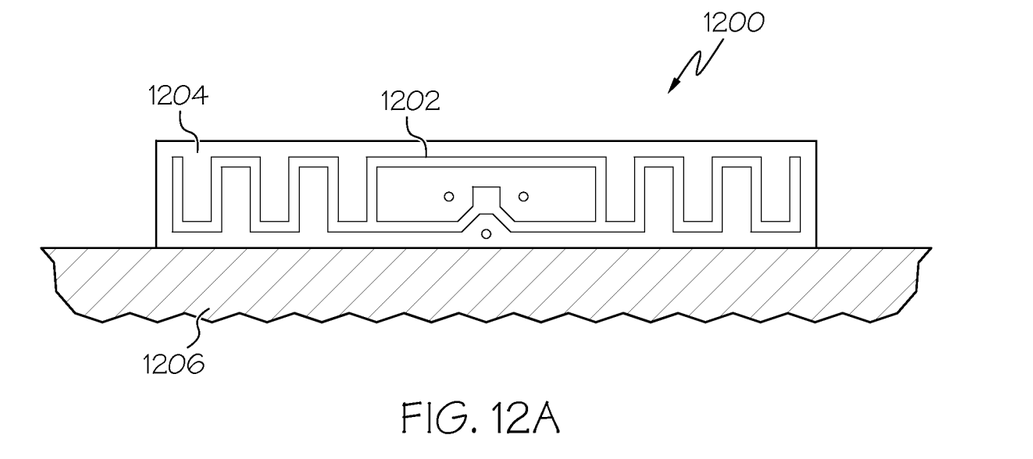
FIG. 12A illustrates a front perspective of the RFID antenna structure attached to a metal surface in accordance with the disclosed architecture.
Figure 12B:
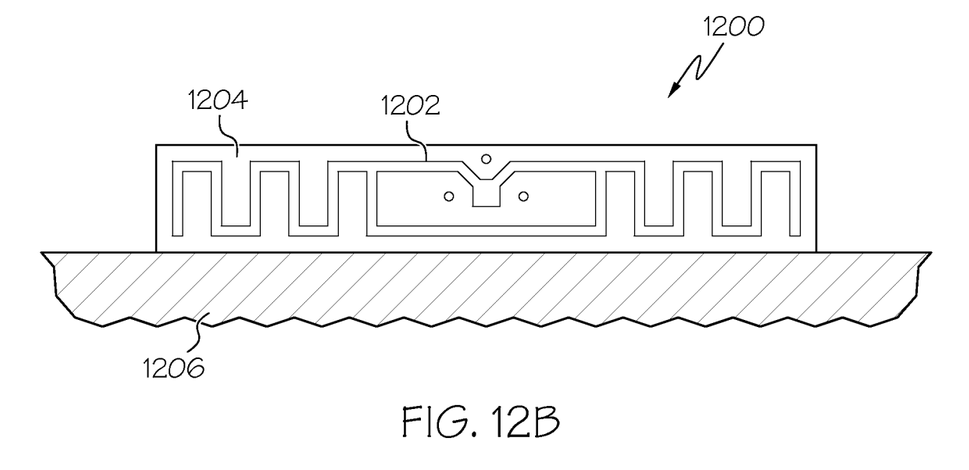
FIG. 12B illustrates a front perspective of another embodiment of the RFID antenna structure attached to a metal surface in accordance with the disclosed architecture.

With reference now to FIGS. 12A-B, the RFID antenna structure 1200 is shown as being attached to a metal surface in different mounting orientations. Specifically, the figures show an RFID inlay 1202 embedded within a plastic material 1204, or any other suitable material. The embedded RFID inlay 1202 has two mounting surfaces that can be attached to a metal surface 1206. Depending on which surface is attached, the tuning and other properties of the RFID antenna structure 1200 can be changed. Further, other structures such as a hexagonal cross-sectional structure, allow multiple mounting orientations which can give different tuning states.

Figure 13A:
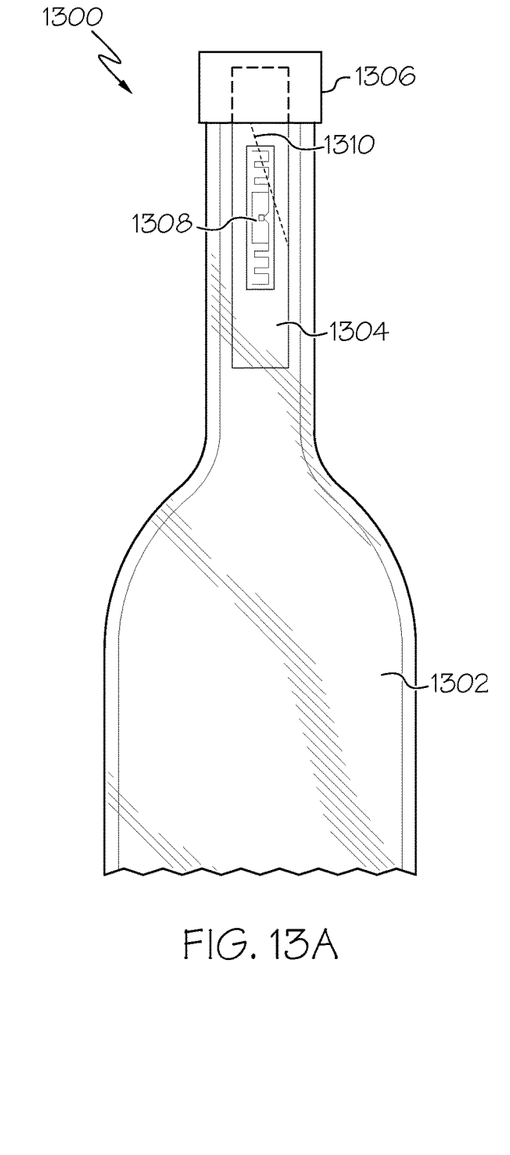
FIG. 13A illustrates a front view of a label positioned on a twist cap container with the RFID inlay over the container in accordance with the disclosed architecture.
Figure 13B:
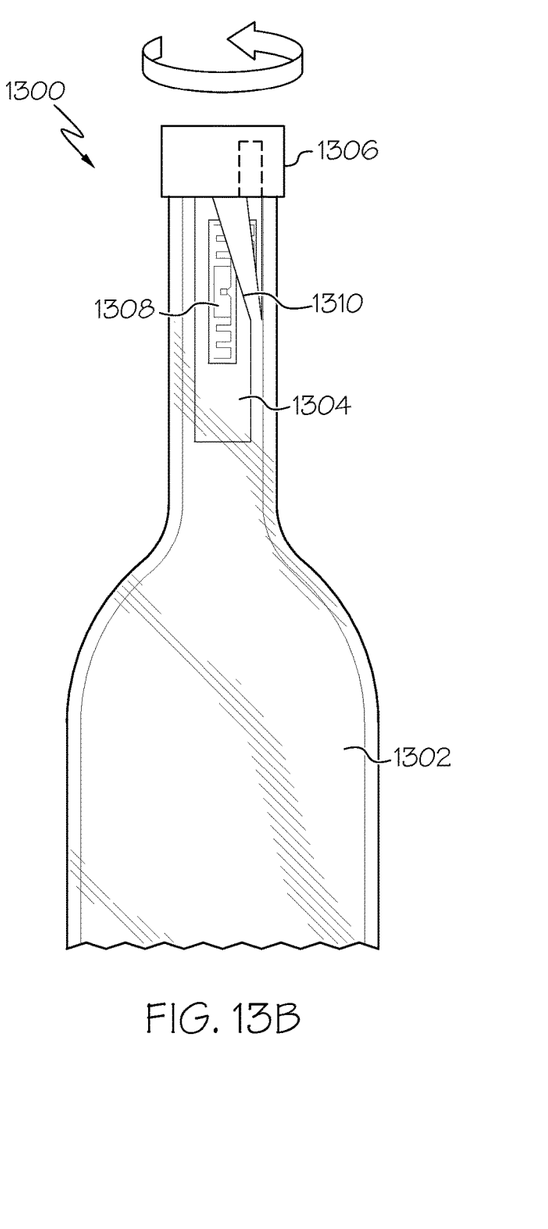
FIG. 13B illustrates a front view of the label and inlay being torn along the perforations in accordance with the disclosed architecture.
Figure 13C:
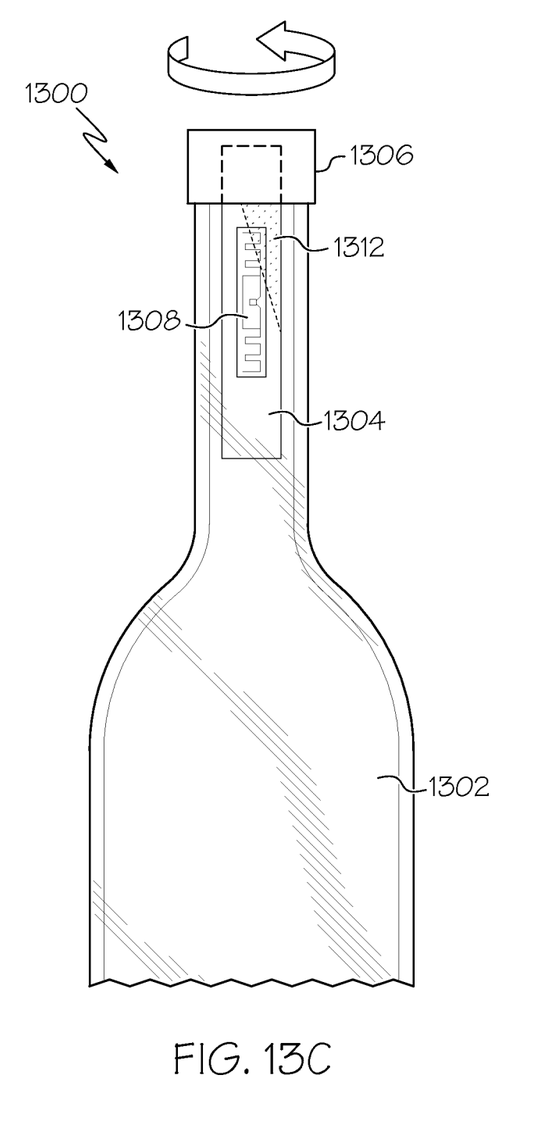
FIG. 13C illustrates a front view of the label with reduced adhesion in accordance with the disclosed architecture.

With reference now to FIGS. 13A-C, the RFID antenna structure 1300 is applied to twist cap containers 1302 as a tamper evident device. Specifically, as shown in FIG. 13A, a label 1304 is positioned over a twist cap 1306 and over the container (or bottle) 1302 neck with an RFID inlay 1308 positioned only over the container (or bottle) 1302. A perforation strip 1310 is engineered over the label 1304 and the RFID inlay 1308. Twisting of the cap 1306 to expose the container 1302 opening, propagates the tearing in and along the weakened path (i.e., perforation strip 1310) across and down through the label 1304 and inlay 1308 on the container 1302, disabling the inlay 1308 (as shown in FIG. 13B). Thus, the RFID inlay 1308 is disabled when the cap 1306 is twisted off (i.e., the bottle is opened).

Furthermore, the perforation strip 1310 can be any engineered path that propagates a tear along a predetermined path, such that the predetermined path may be defined as any designed/engineered weakening in the label/inlay construction. In a preferred embodiment, the weakening is by perforation or scoring of certain layers in the label/inlay construction. In a further embodiment shown in FIG. 13C, the label 1304 comprises no or a reduced adhesion in certain areas 1312. These areas 1312 of little or no adhesive facilitate ease of separation of the perforated path through the label 1304 and inlay 1308.

Figure 14A:
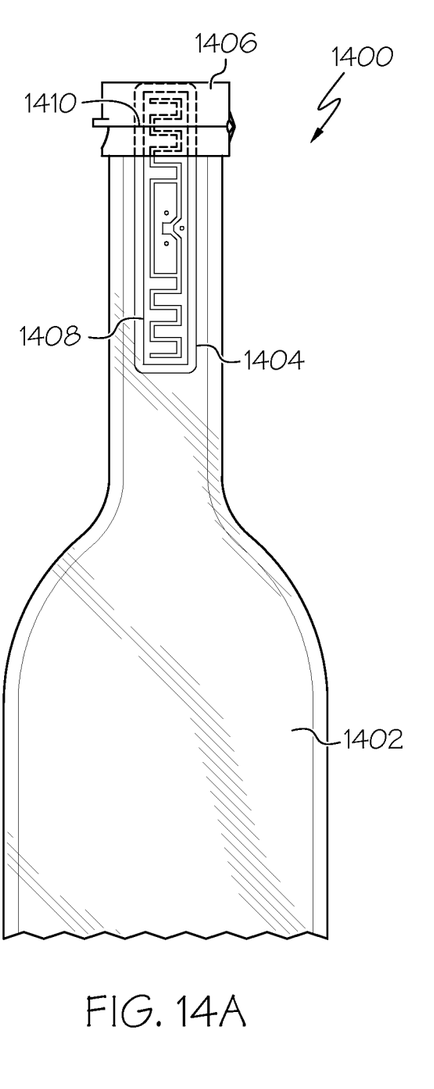
FIG. 14A illustrates a front view of a label positioned on a flip-top cap container with the RFID inlay over both the cap and the container in accordance with the disclosed architecture.
Figure 14B:
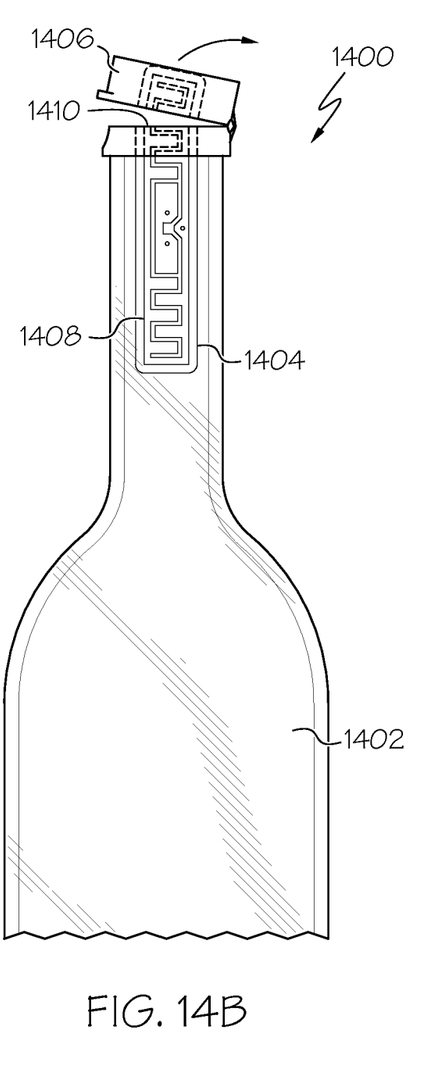
FIG. 14B illustrates a front view of the label and inlay being torn along the perforations in accordance with the disclosed architecture.

With reference now to FIGS. 14A-B, the RFID antenna structure 1400 is applied to fliptop cap containers 1402 as a tamper evident device. Specifically, as shown in FIG. 14A, a label 1404 is positioned over a flip-top cap 1406 and over the container (or bottle) 1402 neck with an RFID inlay 1408 positioned over the flip-top can 1406 and over the container (or bottle) 1402 as well. A perforation strip 1410 is engineered over the label 1404 and the RFID inlay 1408. Flipping open the cap 1406 to expose the container 1402 opening, propagates the tearing in and along the weakened path (i.e., perforation strip 1410) across and down through the label 1404 and inlay 1408 on the container 1402, disabling the inlay 1408 (as shown in FIG. 14B). Thus, the RFID inlay 1408 is disabled when the cap 1406 is flipped open (i.e., the bottle is opened). Furthermore, the perforation strip 1410 can be any engineered path that propagates a tear along a predetermined path, such that the predetermined path may be defined as any designed/engineered weakening in the label/inlay construction. In a preferred embodiment, the weakening is by perforation or scoring of certain layers in the label/inlay construction.

Figure 15A:
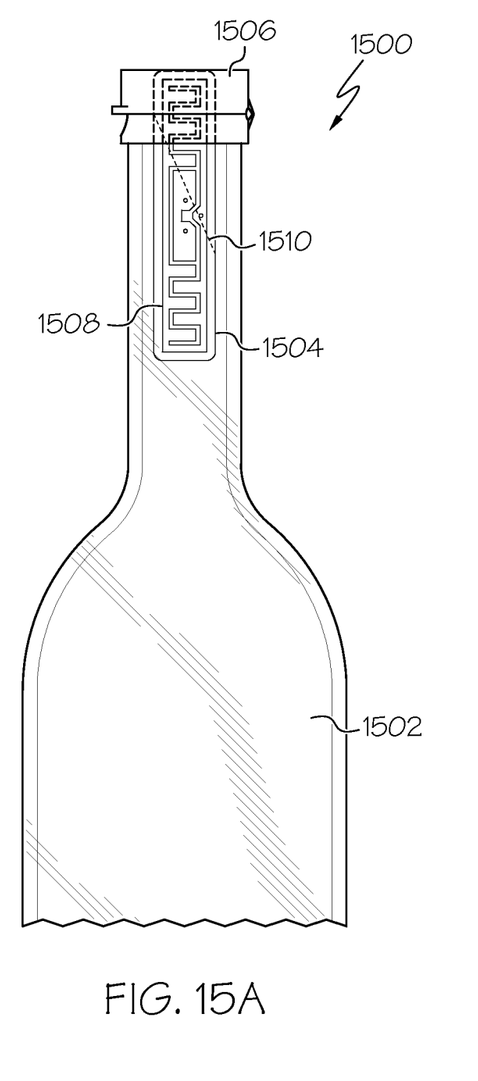
FIG. 15A illustrates a front view of a label positioned on a flip-top cap container with the RFID inlay over the container in accordance with the disclosed architecture.
Figure 15B:
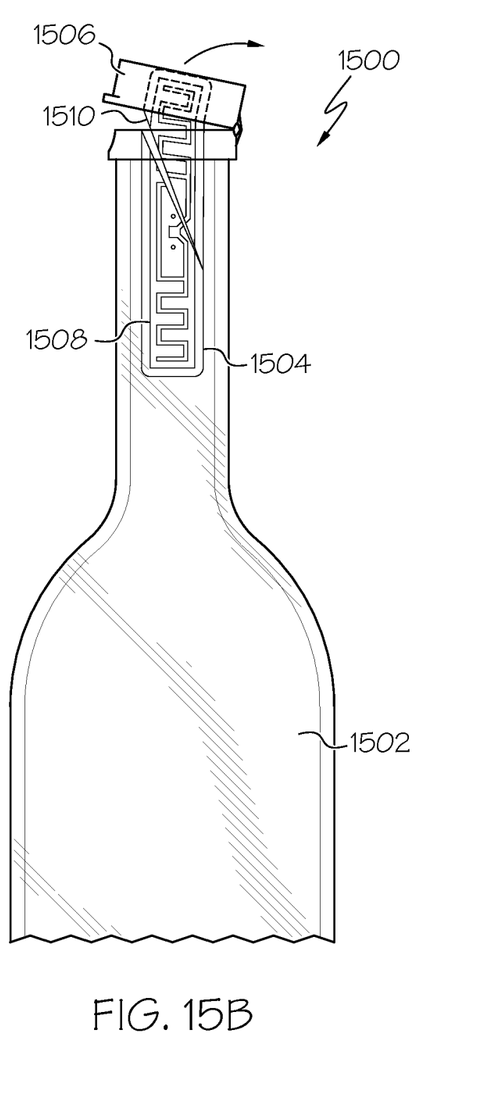
FIG. 15B illustrates a front view of the label and inlay being torn along the perforations in accordance with the disclosed architecture.
Figure 15C:
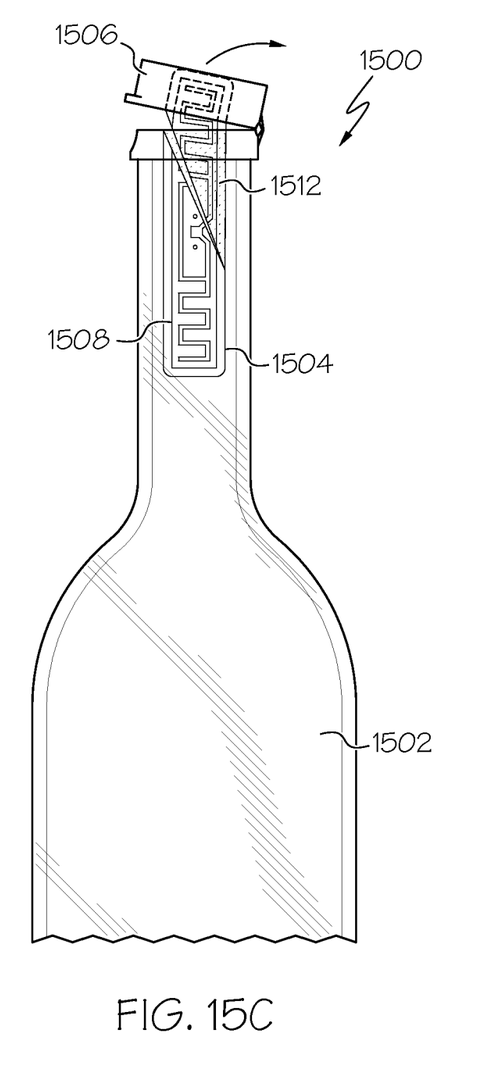
FIG. 15C illustrates a front view of the label with reduced adhesion in accordance with the disclosed architecture.

With reference now to FIGS. 15A-C, the RFID antenna structure 1500 is applied to fliptop cap containers 1502 as a tamper evident device. Specifically, as shown in FIG. 15A, a label 1504 is positioned over a flip-top cap 1506 and over the container (or bottle) 1502 neck with an RFID inlay 1508 positioned only over the container (or bottle) 1502. A perforation strip 1510 is engineered over the label 1504 and the RFID inlay 1508. Flipping open the cap 1506 to expose the container 1502 opening, propagates the tearing in and along the weakened path (i.e., perforation strip 1510) across and down through the label 1504 and inlay 1508 on the container 1502, disabling the inlay 1508 (as shown in FIG. 15B). Thus, the RFID inlay 1508 is disabled when the cap 1506 is flipped open (i.e., the bottle is opened).

Furthermore, the perforation strip 1510 can be any engineered path that propagates a tear along a predetermined path, such that the predetermined path may be defined as any designed/engineered weakening in the label/inlay construction. In a preferred embodiment, the weakening is by perforation or scoring of certain layers in the label/inlay construction. In a further embodiment shown in FIG. 15C, the label 1504 comprises no or a reduced adhesion in certain areas 1512. These areas 1512 of little or no adhesive facilitate ease of separation of the perforated path through the label 1504 and inlay 1508.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A RFID antenna structure designed to operate in proximity to conductive surfaces, comprising:
    an RFID inlay made by flat roll to roll lamination having at least one mounting surface;
    a pair of plastic layers; and
    a metal layer; and wherein the RFID inlay is sandwiched between the pair of plastic layers by lamination; and wherein the RFID inlay is positioned 90 degrees to the metal layer on an edge of the RFID inlay such that the edge is in proximity to the metal layer allowing the RFID antenna structure to operate with a distance from the edge of the RFID inlay to the metal layer and the RFID inlay is either wrapped in a number of shapes, wrapped around a form and placed in a cavity, or incorporated into a structure by injection molding and the RFID inlay is capable of functioning on a metal surface.

2. The RFID antenna structure of claim 1, wherein the antenna is a dipole antenna.

3. The RFID antenna structure of claim 1, wherein the RFID antenna structure comprises a biaxially-oriented polypropylene face.

4. The RFID antenna structure of claim 1, wherein the antenna structure is constructed out of aluminum.

5. The RFID antenna structure of claim 1, wherein the antenna structure is constructed out of copper.

6. The RFID antenna structure of claim 1, wherein the antenna structure is constructed out of silver.

7. The RFID antenna structure of claim 1, wherein the RFID antenna structure is a hexagonal cross-sectional structure.

8. A RFID antenna structure designed to operate in proximity to conductive surfaces, comprising:
   RFID inlay having at least one mounting surface, formed into a circle and positioned within an interior of a lid of a container and the RFID inlay is positioned against threads of the lid;
   a plastic layer; and
   a metal layer; and
   wherein the RFID inlay is extruded into the plastic layer and is centrally disposed of the extruded plastic layer; and wherein the RFID inlay is positioned 90 degrees to the metal layer on an edge of the RFID inlay such that the edge is in proximity to the metal layer allowing the RFID antenna structure to operate with a distance from the edge of the RFID inlay to the metal layer.

9. The RFID antenna structure of claim 8, wherein the antenna structure comprises a permanent adhesive to secure the RFID antenna structure to the lid.

10. The RFID antenna structure of claim 8, wherein the RFID inlay is positioned down a center of an extrusion.

11. The RFID antenna structure of claim 8, wherein the antenna is a dipole antenna.

12. A RFID antenna structure designed to operate in proximity to conductive surfaces, comprising:
   an RFID inlay;
   a plastic component; and
   a metal layer; and
   wherein the RFID inlay is wrapped in spiral form around a round object having a hole so that the RFID inlay is wrapped around an internal surface of the round object; and wherein the RFID inlay is positioned 90 degrees to the metal layer on an edge of the RFID inlay such that the edge is in proximity to the metal layer allowing the RFID antenna structure to operate with a distance from the edge of the RFID inlay to the metal layer.

13. The RFID antenna structure of claim 12, wherein the object is fixed by a bolt or a screw to a surface.

14. The RFID antenna structure of claim 12, wherein the RFID inlay is wrapped into a flat edge spiral.

* * * * *